US008075876B2

(12) United States Patent
Pavlicek et al.

(10) Patent No.: US 8,075,876 B2
(45) Date of Patent: Dec. 13, 2011

(54) TREATMENT OF ANIMAL LITTER WITH FERRIC SULFATE GRANULES

(75) Inventors: Jan J. Pavlicek, Detroit, MI (US); Victor Johnson, Campbell, AL (US)

(73) Assignee: Kemira Water Solutions, Inc., Lakeland, FL (US)

( * ) Notice: Subject to any disclaimer, the term of this patent is extended or adjusted under 35 U.S.C. 154(b) by 600 days.

(21) Appl. No.: 12/018,499

(22) Filed: Jan. 23, 2008

(65) Prior Publication Data

US 2008/0173248 A1 Jul. 24, 2008

Related U.S. Application Data (60) Provisional application No. 60/881,887, filed on Jan. 23, 2007.

(51) Int. Cl.
*A61L 9/012* (2006.01)

(52) U.S. Cl. ........... 424/76.6; 71/15; 71/63; 119/171; 424/76.8; 424/76.9; 424/400; 424/489; 424/647; 424/709

(58) Field of Classification Search .............. None
See application file for complete search history.

(56) References Cited

U.S. PATENT DOCUMENTS

| | | | |
|---|---|---|---|
| 5,622,697 A | 4/1997 | Moore, Jr. | |
| 5,766,566 A | 6/1998 | Mattila et al. | |
| 5,914,104 A | 6/1999 | Moore, Jr. | |
| 5,928,403 A | 7/1999 | Moore, Jr. | |
| 5,961,968 A | 10/1999 | Moore, Jr. | |
| 6,468,518 B2 | 10/2002 | Lind et al. | |
| 6,890,438 B2 | 5/2005 | Shankar et al. | |
| 2001/0011646 A1 | 8/2001 | Moore, Jr. | |
| 2002/0170500 A1 | 11/2002 | Lind et al. | |
| 2004/0005784 A1 | 1/2004 | Chen et al. | |
| 2006/0005784 A1 | 1/2006 | Lind | |
| 2008/0050273 A1* | 2/2008 | Agblevor et al. ........... 422/5 |

FOREIGN PATENT DOCUMENTS

| | | |
|---|---|---|
| EP | 0723935 A1 | 1/1996 |
| FR | 2704849 A1 | 5/1993 |
| WO | WO-02/12139 * | 2/2002 |

OTHER PUBLICATIONS

Kemira Water Solutions, Inc., FERIX-3, Granular Ferric Sulfate, May 25, 2001.
21CFR 184.1307 Ferric sulfate; 21 CFR CH. 1 (Apr. 1, 2001 Edition).

(Continued)

*Primary Examiner* — Neil Levy
(74) *Attorney, Agent, or Firm* — Thomas, Kayden, Horstemeyer & Risley, LLP (57) ABSTRACT

Methods of treating animal litter and/or bedding material for control of volatile ammonia and soluble phosphorous include applying granular partially hydrated ferric sulfate to the litter. The partially hydrated ferric sulfate ranges from gray to tan in color and is spread onto the litter at a rate effective to reduce ammonia volatilization and reduce soluble phosphorous. Relative to reagent grade ferric sulfate, the partially hydrated ferric sulfate exhibits lower hygroscopicity and higher deliquescence. The ferric sulfate is prepared by a process comprising oxidizing ferrous sulfate with sulfuric acid using a molecular oxygen oxidizing agent at an elevated pressure relative to atmospheric and at a temperature of 60° C. to 140° C. to produce a gray to tan colored granular product.

6 Claims, 13 Drawing Sheets

OTHER PUBLICATIONS

"Practices to Reduce Ammonia Emissions from Livestock Operations", Iowa State University, Jul. 2004.

Li et al., "Reduction of Ammonia Emission from Stored Poultry Manure Using Additives: Zeolite, Al+ clear, Ferix-3 and PLT", An ASABE Meeting Presentation, Paper No. 064188, Portland, Oregon, Jul. 9-12, 2006.

Airsheds and Watershed III: A shared Resources Workshop; "The Significance of Ammonia To Coastal and Estuarine Areas", Nov. 15-16, 2000.

Product Data Sheet from General Chemical "A1+Clear (r) Poultry Grade Alum", Undated, 1 page.

International Search Report; Date of Mailing: Aug. 26, 2010 for International Application No. PCT/US2010/035931; 6 pages.

Written Opinion; Date of Mailing: Aug. 26, 2010 for International Application No. PCT/US2010/035931; 6 pages.

* cited by examiner

TREATMENT OF ANIMAL LITTER WITH FERRIC SULFATE GRANULES

CROSS REFERENCE TO RELATED APPLICATIONS

This application relates to and claims priority to U.S. Provisional Patent Application No. 60/881,887, filed on Jan. 23, 2007, and incorporated herein by reference in its entirety.

BACKGROUND OF INVENTION

This disclosure generally relates to the use of iron salts to lower ammonia emissions and sequester soluble phosphorous in animal litter or bedding materials, and more particularly, to the use of a ferric sulfate composition applied as a granular solid to the animal litter.

Ammonia is a common by-product of animal waste due to the often inefficient conversion of feed nitrogen into animal product. Livestock and poultry are often fed high-protein feed, which contains surplus nitrogen, to ensure that the animals' nutritional requirements are met. Nitrogen that is not metabolized into animal protein (i.e., milk, meat, or eggs) is excreted in the urine and feces of livestock where further microbial action releases ammonia into the air during manure decomposition. Because of this, in-house air quality is a major concern. Producers spend much of their time and investment in maintaining good air quality to maximize growth and performance of livestock. Ammonia levels of 25 ppm or more can lead to significant health problems for the animals including respiratory infections and eye lesions, or even death of the animal. For example, previous work has correlated negative bird performance with poor indoor air quality in poultry growing and holding areas due to ammonia ($NH_3$) and dusts. Low growth rates, low feed utilization rates, high mortality rates, costs of house ventilation especially in the cooler months are all losses that can be related to the quantities of ammonia and ammonia compounds generated by livestock. As used herein, the term "livestock" is intended to refer to poultry, swine, cattle, horses, and like animals that are generally contained within a confined area for extended periods of time.

Ammonia is a colorless, alkaline, water-soluble gas that is produced by microbiological deamination or reduction of nitrogenous substances. Animal litter, a combination of fecal material, spilled feed, bedding material, and the like, provides a source of ammonia emissions within floor-reared production facilities. For example, birds excrete excess nitrogen (N) in the form of uric acid and it is the microbial decomposition of uric acid within the litter, which is the primary source of ammonia generation. Litter type, management, humidity, pH, and temperature all affect ammonia generation and concentration. Ammonia volatilization is a complex physical and chemical process and emissions are generally related to four factors: ammonium ion concentration of the medium, temperature of the medium, pH of the medium and turbulent transport of the ammonia from the medium. There is a trend within the industry for tighter house design and less frequent litter or bedding material removal. These two factors have the potential to dramatically increase the ammonia concentration within production facilities.

With respect to poultry houses, commercial poultry producers generally employ some form of ventilation to mitigate volatile ammonia concentrations emanating from decomposing animal litter in their houses. Current ventilation methods consume energy both for air exchange and for heating makeup air.

Animals are also susceptible to ingestion of materials used in litter and/or bedding material treatments. A typical material used is alum, i.e., aluminum sulfate. Application of urease inhibitors to cattle and/or swine manure has effectively limited urea hydrolysis in laboratory and field studies. Such inhibitors are easily degradable and must be continuously applied to manure in order to reduce the production of ammonia from urea. Still other litter amendment materials include ferrous sulfate, liquid ferric sulfate or chloride, and the like. In U.S. Patent Application No. 2006/0005784 A1, the use of the liquid ferric sulfate or chloride is described as an advantage over granular reagent grade ferric sulfate crystals because the animals can ingest the granular form of ferric sulfate crystals and the use of the solid form to be distributed in practical quantities is reported to be marginally effective. The ferric sulfate crystals, whether they be technical or reagent grade, have a yellowish to white color that is generally distinguishable from the litter and common materials used in the house such that it can be visible to the animals, which leads to accidental ingestion since the animals can confuse the litter amendment with feed.

In addition to the production and welfare impacts, there is growing public concern over outdoor air quality and the amount of pollutants released by animal feeding operations (AFOs). Of greatest interest are the emissions of ammonia and particulate matter. Environmental air and water quality potentially can be impacted by animal production emissions in the form of atmospheric nitrogen deposition. Since these emissions originate from within the production facilities, strategies to reduce the generation of dust, ammonia, and odors within houses will have a corresponding impact on the level of house emissions.

One technique to reduce emissions from production facilities, such as poultry production barns, lowers the pH of the litter to maximize conversion of volatile ammonia to ammonium ion ($NH_4^+$). Application of litter treatments to reduce the pH of the litter is the mechanism used to accomplish the pH reduction. Typical acidifier litter treatments such as alum are effective for short-term ammonia reduction, up to approximately two weeks. Amounts required for longer-term effectiveness in chemically binding litter nitrogen are corrosive, represent additional hazards to the animals, and are difficult to apply with the animals present in the production facility.

Soluble litter phosphorous (P) in the form of phosphates ($PO_4^{-2}$) is another concern when land-applied to lands already overburdened with phosphates and susceptible to surface water runoff and edge of field erosion. Products that can bind soluble phosphorous in land-applied animal litter and/or bedding material would benefit the industry in addressing water quality impacts from these various operations.

In view of the foregoing, there accordingly remains a continued need in the industry to more efficiently address the problems associated with volatile ammonia emissions and soluble phosphorous in animal litter and/or bedding materials.

BRIEF SUMMARY

The above-described concerns and disadvantages are addressed using a form of ferric sulfate that is formulated to be a granular solid, has minimal dust component, exhibits excellent storage stability, and possesses relatively low hygroscopic properties for ease in handling and storage while rapidly deliquescing when applied to animal litter and/or bedding material. In one embodiment, a method of treating animal litter and/or bedding material for control of volatile ammonia and soluble phosphorous comprises applying a granular form of a partially hydrated ferric sulfate composition to the animal litter at a coverage rate effective to reduce ammonia emissions and reduce soluble phosphorous levels, wherein the ferric sulfate is prepared by a process comprising oxidizing ferrous sulfate with sulfuric acid using a molecular oxygen oxidizing agent at an elevated pressure relative to atmospheric and at a temperature of 60° C. to 140° C. to produce a slurry, and drying the slurry to produce a gray to tan colored granular product gray to tan colored granular product.

In another embodiment, a method of treating animal litter and/or bedding material for control of volatile ammonia and soluble phosphorous comprises applying a granular form of a partially hydrated ferric sulfate composition to the animal litter and/or bedding material at a coverage rate effective to reduce ammonia emissions and reduce soluble phosphorous levels, wherein the ferric sulfate has a substantially kornelite crystalline structure.

The above discussed and other features and advantages of the present disclosure will be appreciated and understood by those skilled in the art from the following detailed description and drawings.

BRIEF DESCRIPTION OF THE DRAWINGS

Referring now to the figures, which are exemplary embodiments and wherein like elements are numbered alike:

FIG. 1 graphically illustrates ammonia concentrations estimated using dosimeter tubes and litter moisture content in the Comp-1 (Houses 1 and 2) and Inv-1 (Houses 3 and 4) houses. Averages are the means of Comp-1 and Inv-1 houses.

FIG. 2 graphically illustrates ammonia concentrations normalized with respect to ventilation rates in Comp-1 and Inv-1 houses compared to house air temperature, percent litter moisture, and fan-flow periods per day.

FIG. 3 graphically illustrates litter analysis of Comp-1 and Inv-1 litters.

FIG. 4 graphically illustrates litter analysis of Comp-1 and Inv-1 litters.

FIG. 5 graphically illustrates litter analysis of Comp-1 and Inv-1 litters.

DETAILED DESCRIPTION

Disclosed herein are processes for treating animal litter and/or bedding material that inhibit ammonia volatilization and reduce soluble phosphorous levels in the litters, among other benefits. The processes are suitable for various animal litter and/or bedding materials including, but not limited to, those associated with dairy cattle ad/or calves, swine, equine, poultry, and the like. The processes generally include application of a granular form of a ferric sulfate composition to the animal litter and/or bedding material. The ferric sulfate composition is prepared by a process that results in a product that is a gray to tan colored, possesses relatively low hygroscopic properties yet deliquesces rapidly after application, effectively inhibits ammonia volatilization, and effectively reduces soluble phosphorous levels as will be discussed in greater detail below. Relative to reagent or technical grade ferric sulfate crystals, which are generally yellow to white in color, Applicants have unexpectedly discovered that the gray to tan colored ferric sulfate composition is indistinguishable from the litter and/or bedding materials commonly used in the animal production facilities, thereby lowering inadvertent ingestion of ferric sulfate by the animals since it has been discovered that the yellow to white colored technical or reagent grade ferric sulfate product when applied as a granular solid can be distinguishable and can be confused as a food product and accidentally ingested. Ingestion of litter amendment can affect productivity. This is especially advantageous as it relates to poultry since it has been qualitatively observed that the birds do not associate the granular form of the so-colored ferric sulfate as feed material.

In addition to the color differences, Applicant has unexpectedly discovered that its ferric sulfate composition is partially hydrated and deliquesces faster than technical or reagent grade ferric sulfate. It is believed that the non-homogenous crystalline structure is a causal factor in the observed increase in deliquescence. As used herein, the term "reagent grade" generally refers to a compound with the purity and quality that allows it to be used in a laboratory and the term "technical grade" generally refers to a lower purity product suitable for commercial application. While not wanting to be bound by theory, it is believed that the byproducts produced during the process for making the ferric sulfate composition of the present disclosure unexpectedly increases the deliquescence rate once applied. Also, it has been unexpectedly discovered that the ferric sulfate composition has improved anti-clumping behavior due to the fact that it is less hygroscopic than reagent grade ferric sulfate leading to improved handling as well as application due to its increased spreadability. Still further, the ferric sulfate composition creates less dust, therefore presenting fewer hazards to the applicator and being less corrosive to adjacent structures within the house compared to aluminum and sulfuric acid based litter treatment materials, which tend to produce high amounts of undesirable dust or fog.

It was also unexpectedly discovered that with continued applications of the product there are indications of apparent drying of the litter in the built-up litter house. While not wanting to be bound by theory, this most likely is the result of utilization of the various hydration states of the ferric sulfate composition and downstream reaction products as discussed in greater detail below. This manifestation of the product will promote lower biological activity in the litter, thereby reducing biological conversion of organic ammonia to inorganic ammonia and also, by environmental de-optimization, reduce the generation and proliferation of various undesirable microorganisms. This manifestation also reduces the amount of caking and thereby reduces quantities of litter for disposal in built up litter operations. A downstream advantage to the grower becomes the ability to maintain various dry built-up litter beddings which have been an indicator in the production of quality "chicken paw" food products.

Unlike processes for preparing reagent or technical grade ferric sulfate, the present ferric sulfate composition is prepared by oxidation of ferrous sulfate with sulfuric acid using a molecular oxygen oxidizing agent at an elevated pressure relative to atmospheric and at a temperature of 60° C. to 140° C. Solidification of such slurry can be conducted advantageously by cooling, by means of a plate granulator, by means of a drum granulator, or by any other corresponding method. By way of example, the resulting slurry can spheroidized in a drum granulator. A preferred process for preparing the ferric sulfate salt composition suitable for use in the present disclosure is described in U.S. Pat. No. 5,766,566, incorporated herein by reference in its entirety. Non-homogenous partially hydrated crystals of ferric sulfate are formed in a matrix, which provides the ferric sulfate composition with relatively with low hygroscopicity and high deliquescence. In one embodiment, the partially hydrated ferric sulfate crystals is of the formula $Fe_2(SO_4)_3 \cdot nH_2O$, wherein n is an integer from 1 to 10. In another embodiment, n is an integer from 5 to 9. This unique combination of properties provides improved handling, spreadability, and dissolution upon application. Moreover, it has been found that the ferric sulfate composition is stable under typical storage conditions and highly deliquescent once applied. As noted above, the color of the ferric sulfate composition is gray to tan. A preferred partially hydrated ferric sulfate has a substantially kornelite crystalline of the formula: $Fe_2(SO_4)_3 \cdot 7H_2O$. By the term substantially, it is meant greater than 50 percent of the total crystallinity provided in the granules.

In one embodiment, the ferric sulfate composition exhibiting the expressed advantages has the properties as listed in Table 1 and has a substantially kornelite crystalline of the formula: $Fe_2(SO_4)_3 \cdot 7H_2O$. The color of the product ranges from gray to tan and is generally indistinguishable from the litter and/or bedding material, thereby lowering the likelihood of inadvertent ingestion.

TABLE 1

| | |
|---|---|
| Particle size (50%) | <2-3 mm |
| Particle size (100%) | <7 mm |
| Dust (<0.2 mm) | Max 3% |
| Appearance | Gray to tan granules |
| Total Fe (3) | 19.5 ± 1.0% |
| Fe (2) | ≦1.0% |
| Free $H_2SO_4$ | <1.5% |
| Sulfate | 54 ± 2.0% |
| pH | <2 |
| Arsenic | <0.2 mg/kg |
| Cadmium | <0.1 mg/kg |
| Calcium | <0.002% |
| Chromium | <20 mg/kg |
| Magnesium | <0.4-0.8% |
| Manganese | <2300 mg/kg |
| Mercury | <0.1 mg/kg |
| Nickel | <50 mg/kg |
| Lead | <5 mg/kg |
| Selenium | <1.0 mg/kg |
| Titanium | <0.06% |

The ferric sulfate composition is more effective than existing aluminum sulfuric acid and sodium bisulfate based treatments through the intrinsic oxidizing potential of the ferric or Iron III ion. Ferric or Iron III ion creates a higher redox potential, and in this oxidative environment, the anaerobic and facultative microorganisms that normally drive the production of ammonia and ammonia compounds and other potentially deleterious microorganisms are thereby inhibited and/or reduced. This provides a significant improvement over existing litter treatments based on aluminum, sulfuric acid and sodium bisulfate that do not provide a significant inhibiting oxidative capability. This capability extends the treatment effectiveness beyond existing treatment products. This potentially permits fewer applications and/or less product being used, requiring less labor.

Comparing the granular ferric sulfate composition to other products available, (e.g., liquid alum, dry alum, sulfuric acid, reagent or technical grade ferrous sulfate crystals, reagent or technical grade ferric sulfate crystals, sodium bisulfate materials, and the like) the application of the material delivers an equal quantity or more molecules per unit weight for reaction and therefore treatment. This also potentially permits longer control, requiring less labor.

It has been observed that the granular partially hydrated ferric sulfate composition as produced by the process described above exhibits excellent storage stability but more rapidly dissolves (i.e., deliquesces faster) on application compared to other dry based materials including reagent or technical grade ferric sulfate crystals and therefore are able to protect the animals sooner with less lead time. This is especially advantageous during the brooding period of growth for poultry facilities when the chicks are first introduced to the house and where environment most influences future growth rates. Table 2 provides an indication of the differences in hygroscopy between technical grade ferric sulfate (commercially obtained under the trade name Ferri-Floc) and a ferric sulfate composition ($Fe_2(SO_4)_3 \cdot 7H_2O$) of the present disclosure after exposure to different levels of relative humidity after a period of 6 days. The data for the ferric sulfate composition represented an average relative humidity for two batches manufactured on different days. The data shows that upon exposure to higher humidity, the absorption of water as indicated by a percent change in weight was unexpectedly and significantly less for the ferric sulfate composition produced in accordance with the present disclosure than the technical grade ferric sulfate. In actual trial conditions it was observed that other products based on sodium bisulfate ($NaHSO_4$) are very hygroscopic and tend to absorb moisture directly and quickly from the air. This tendency can produce undesirable wet areas throughout the growing facility, on the paper used for chicks and on the litter itself. The ferric sulfate composition in accordance with the present disclosure has been found to be less hygroscopic when applied in the growing facility eliminating the occurrences of litter and paper wetness. With the $NaHSO_4$ products this tendency toward fast activation also puts the grower on a tight schedule with respect to treatment application time and chick placement. Additionally the production facility must be pre-heated prior to placement of the litter amendment requiring more energy. Application of these litter treatments is required within 24 hours to protect both humans and animals in the growing facility. The granular partially hydrated ferric sulfate composition has been found to be less critical in this respect and generally allows up to 4 days pre-application of the product prior to chick placement. This provides a wider time frame for the grower with respect to facility preparation

TABLE 2

| | 29% | 45% | 55% | 74% | 88% |
|---|---|---|---|---|---|
| Technical Grade Ferric Sulfate (Ferri-Floc) | 0.3 | 0.08 | 0.25 | 12.9 | 35.3 |
| Ferric Sulfate composition | −0.15 | 0.45 | 2.05 | 8.1 | 20.4 |

The rapidly dissolving form of the product also reduces the potential for direct contact of the product with the animals, the impact being either that the time in between growth cycles is compressed, thereby increasing the efficiency of the grower operation, or that there is greater ammonium reduction in the first critical days of bird growth resulting in higher growth rates and final production weight.

In one embodiment pertaining to its use in poultry production houses, the litter treatments of the ferric sulfate composition are first applied to the house before the first introduction of the chicks on a second grow-out or higher litter cycle. This application of the product serves to protect the animals in their most fragile age. It is at this stage of growth that the house is maintained at a warm temperature, which discourages the use of ventilation. It is therefore an advantage for growers that the ferric sulfate composition permits decreased ventilation while maintaining a healthy environment for the chicks during their first few weeks of growth. In this manner, growth rates are improved, feed utilization rates are increased, lower heating costs are possible due to reduced ventilation, and less exposure to handlers are provided.

It has also been observed that the ferric sulfate composition of the present disclosure as applied to poultry litters provides a 'second wave' of ammonia reduction in the growing facility. While not wanting to be bound by theory, it is believed that the anaerobic environment of the litter has a reducing effect on the ferric form of the product, taking it, in part, to its ferrous state. Additionally, with respect to specific built up litter applications, it is believed that the chemistry and environment can oxidize the reduced iron back to the ferric state. In this context, it is theorized that the secondary ammonia uptake phenomena may be the result of secondary reactions occurring within the complex biological, physical and chemical environments of the litter. A number of available reactions exist that will sequester ammonia compounds through the formation of various ferric and ferrous, ammonium and sulfate complexed compounds such as $Fe(NH_4)_2(SO_4)_2.6H_2O$, $(H_4)_3Fe(SO_4)_3$, $NH_4Fe(SO_4)_2$, $(NH_4)_2Fe(SO_4).Fe_2(SO_4)_3.24H_2O$, and other congeners of same.

The ferric sulfate composition, as applied to the litter and/or bedding material, inhibits the generation of volatilized ammonia and ammonia compounds from poultry litter by lowering overall litter basicity and through the ferric ion inhibitory effect on the growth of ammonia producing microorganisms. Additionally, as the ferric ion is reduced to its ferrous ion state it is then available to react with ammonia and ammonium ions to form iron complexes that effectively sequester the ammonia and ammonium ions from further reaction potential. The combination of these factors extends the effective period of the product and allows the grower to apply product less frequently, approximately 30-50% less often. One application per grow-out cycle is typically employed in the industry. In addition to reducing ammonia emissions, treatment with the ferric sulfate composition has been found to sequester soluble phosphate compounds in the litter and/or bedding material that may be present by reducing the immediate availability of the phosphate contained therein. Leaching of the phosphate from field applied litter proceeds at a much lower rate relative to other available treatments and in some instances is up to 1000 times less.

The disclosure is further illustrated by the following non-limiting example.

EXAMPLE

A four-house broiler farm was selected with houses managed as identically as possible for ventilation, temperature, and humidity. The houses were 36×400 ft and stocked at a rate of 15,700 birds per house. Between flocks, the houses were opened for drying, the litter was 'decaked' by tilling the surface, and the litter surface was top-dressed with pine shavings. One day prior to introduction of the flock, aluminum sulfate (commercially obtained under the trade name Al+Clear® from General Chemical, Inc., and is referred to herein as Comp-1) and ferric sulfate $(Fe_2(SO_4)_3.7H_2O$ commercially obtained under the trademark Ferix-3® from Kemira, and is referred to herein as Inv-1) were applied at a rate of 22.7 kg per 92.9 m² (100 lbs per 1000 ft²) to the litter surface in each of two houses. Comp-1 was applied in houses 1 and 2, and Inv-1 was applied in houses 3 and 4.

Both Comp-1 and Inv-1 litter amendments were applied at the same time and at the same rate of 22.7 kg per 92.9 m² (100 lbs per 1000 ft²) just prior to bird placement. No other application of either litter amendment was made throughout the remainder of the flock cycle. Litter samples were taken prior to application and on day-of-study (DOS) 4, 6, 8, 13, 20, 27, and 36. Analyses of the litter samples included organic N (ON), $NH_4^+$, nitrate N ($NO_3^-$), total N (N), calcium (Ca), copper (Cu), iron (Fe), magnesium, (Mg), manganese (Mn), P, potassium, (K), sodium (Na), sulfur (S), and zinc (Zn). Other analyses included percent moisture, pH, dry matter content, and soluble salts.

House environmental data collection included air temperature, fan flow rate, and aerial ammonia concentration. Ammonia concentrations were measured using two techniques:

1. Dosimeter passive absorption tubes (Gastec, Inc.) were attached at one-meter height in all four houses at locations ¼, ½, and ¾ distance from the air-intake end of the house. They were installed during the prescribed data-collection days (DOS) 2, 4, 6, 8, 13, 20, 27, and 36 and remained in the houses for 6 to 12 hours.
2. A gas-washing technique was used to obtain ammonia concentrations by drawing unfiltered air through gas-washing bottles containing 180 mL of 0.2 N sulfuric acid at a known flow rate (2 L/min).

At the end of the sample period the gas-washing bottles were removed, capped, and taken to a laboratory for extraction into 90 mL glass storage bottles. The samples were refrigerated until analysis by standard colorimetric techniques. The resulting aerial concentrations were converted from a weight-per-volume basis ($\mu g/m^{-3}$) to a volume-basis (ppm) through the use of the gas-law equation. The average seasonal accuracy for the technique was 0.020 ppm ammonia-N. All ammonia concentrations were normalized with respect to the fan-flow rate of house 1 by linear ratio to the other individual house fan-flow periods. Additional data obtained from the host organization included fan-flow rates, house temperature, feed conversion efficiency, and carcass quality.

With respect to the treatments, a considerable amount of dust was generated during the application of the Comp-1 (i.e., aluminum sulfate) treatment compared to the Inv-1 (i.e., ferric sulfate composition) treatment, requiring the applicator to use a facemask during the Comp-1 application but not so during the Inv-1 application. The difference in dust levels was qualitatively observed.

Figure 1A:
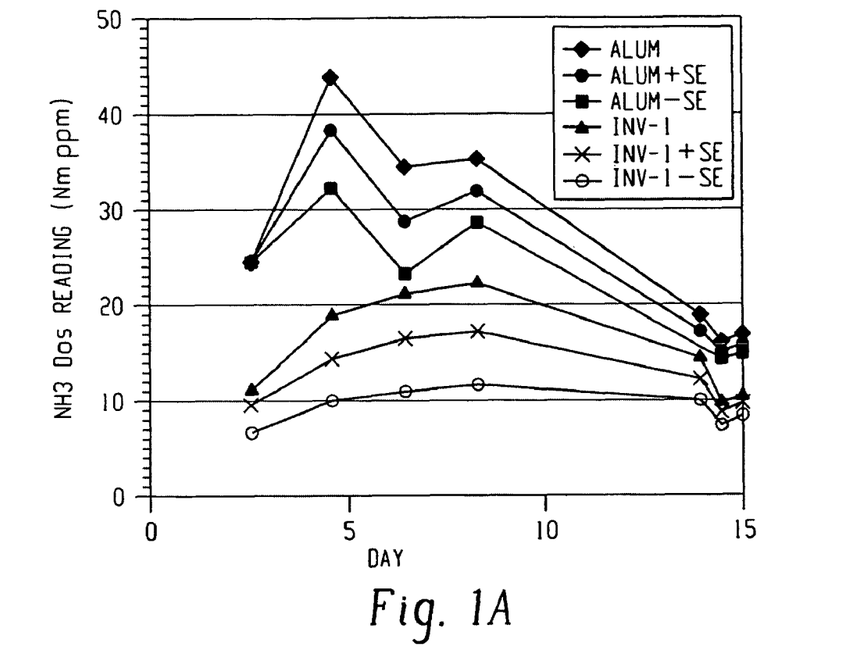
Figure 1B:
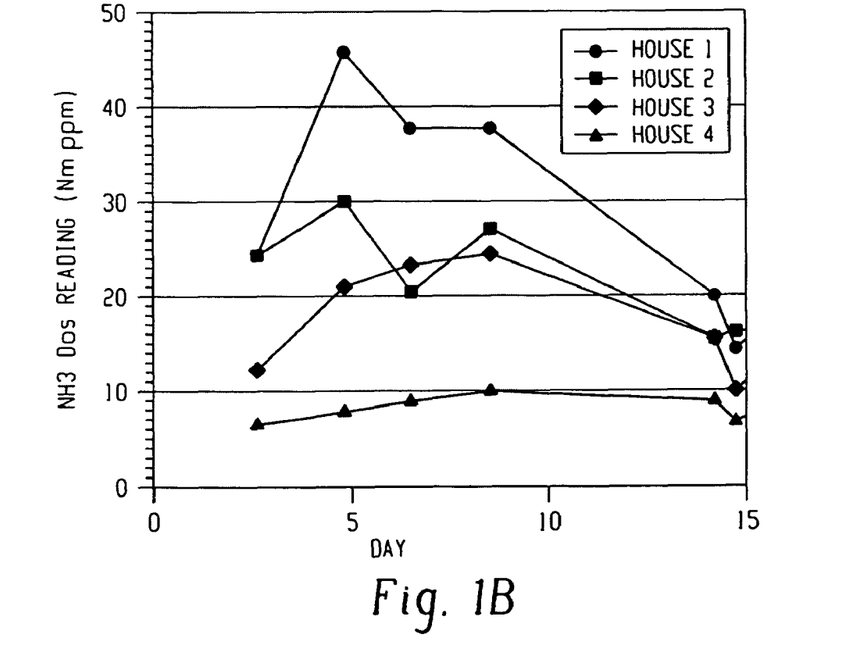
Figure 1C:
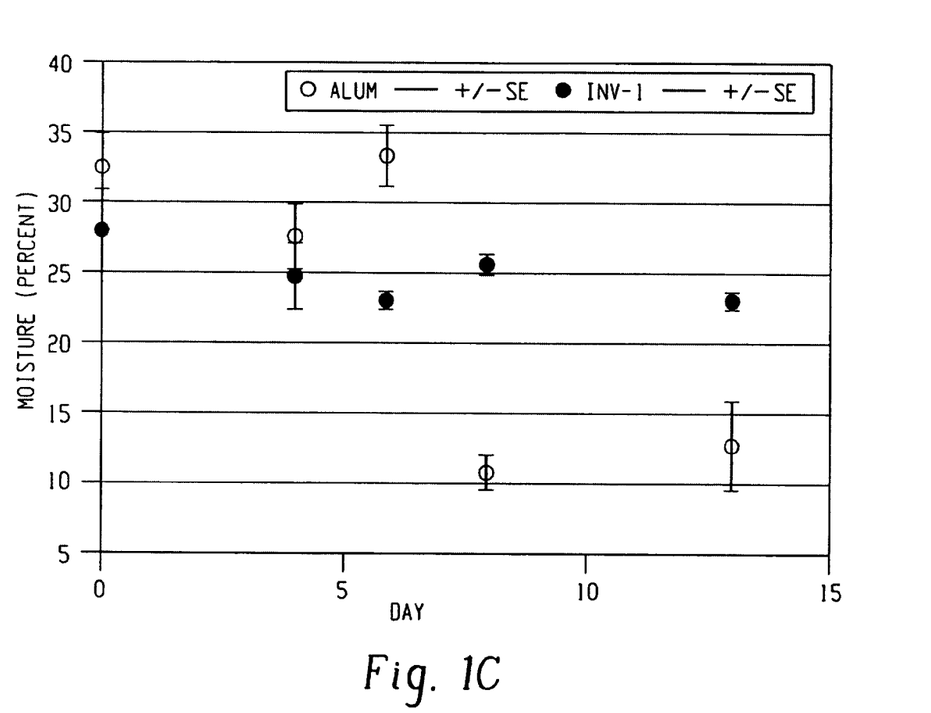

FIGS. 1 and 2 graphically illustrated ammonia concentrations. Houses 2 and 3 were the houses instrumented with gas-washing techniques to accurately establish interior and exterior ammonia concentration (20 ppb for this study). All four houses were instrumented (interior only) with dosimeter tubes (accuracy estimated at a few parts per million (ppm)) for comparison with the gas-washing concentrations. As expected, both measurement techniques showed that ammonia concentrations were lowest after application for both litter treatments (lower in the Inv-1 houses) and increased as the flock aged. Comparing ammonia concentrations in houses 1 and 4 using the dosimeter measurements (FIG. 1B) indicated that the Inv-1 treatment in house 4 was more effective at controlling ammonia than that in the Comp-1 treatment in house 1. The dosimeter tubes showed there was no difference between houses 2 and 3 (FIG. 1B), due likely to excessive litter moisture during the study (FIG. 1C). The averages of both Inv-1 and Comp-1 houses indicate that Inv-1 was more effective for the first 15 days (FIG. 1A). Houses 2 and 3 measurements using more-accurate gas washing ammonia techniques, showed also that the Inv-1 house 3 was more effective at controlling ammonia during the first 7 days (FIG. 2A). After 7 days, the Inv-1 house 3 was less effective than the Comp-1 house 2 because the litter moisture in the Inv-1 house 3 was much higher (FIG. 2D).

Figure 2A:
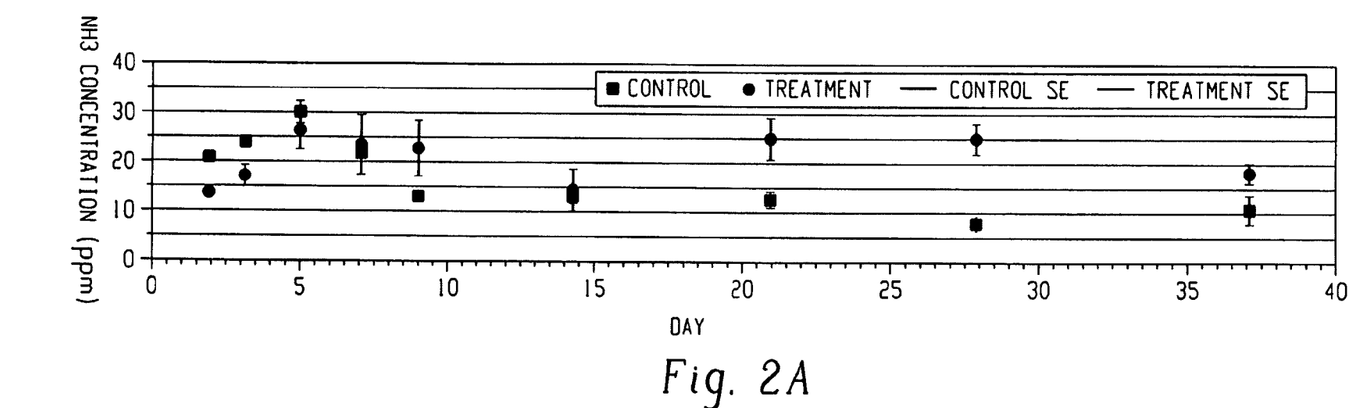
Figure 2B:
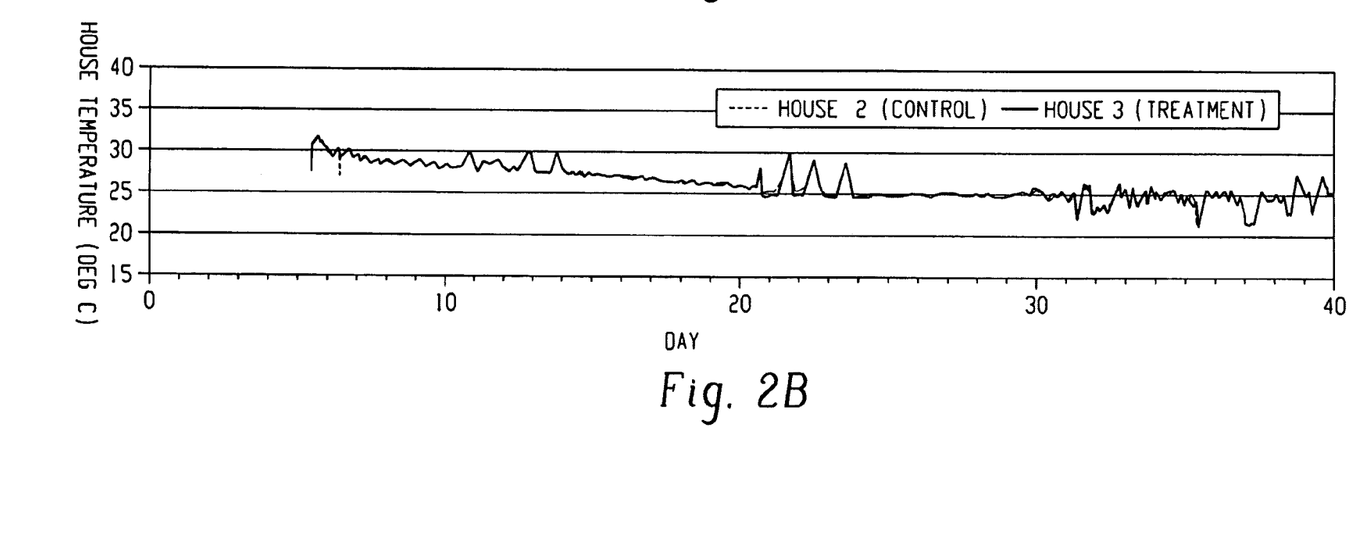
Figure 2C:
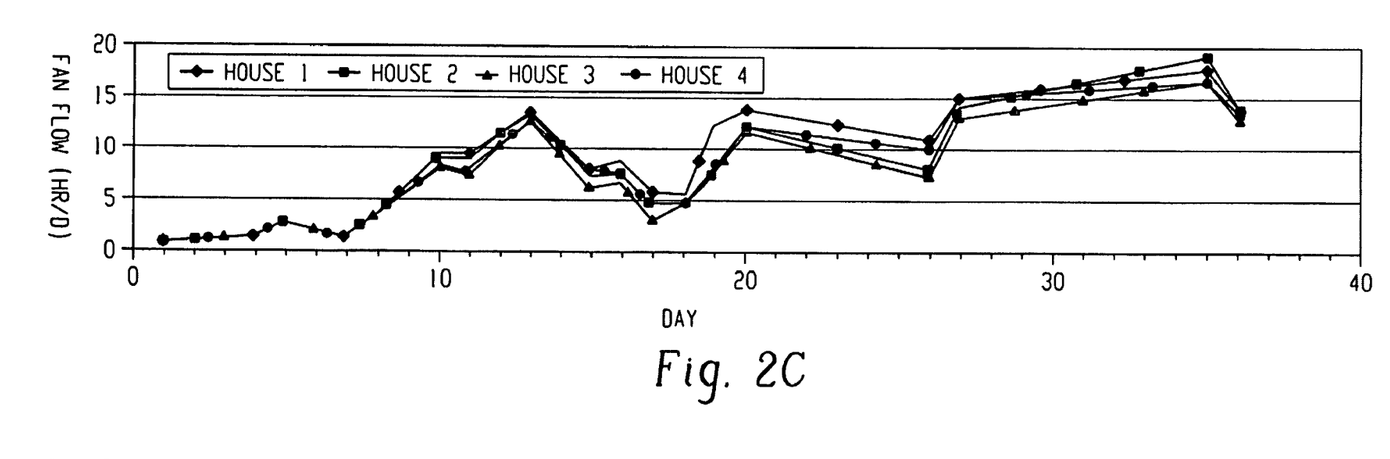
Figure 2D:
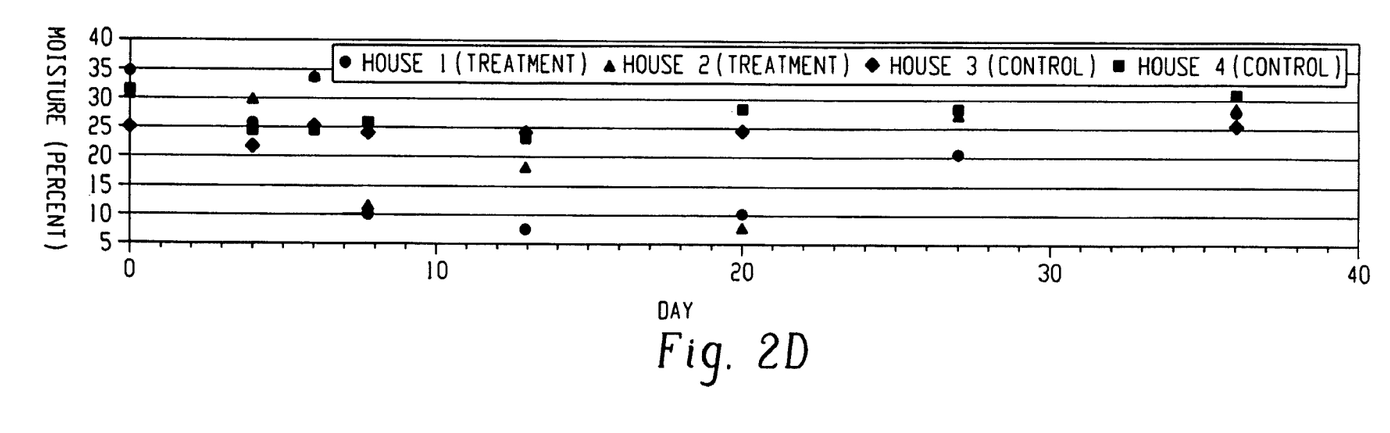

After the first few days, the house temperatures were gradually decreased from a set temperature of 31° C. (by reducing heat input and increasing ventilation) to a final set temperature of 24° C. (about DOS 23). After DOS 10, ambient temperatures increased considerably and ventilation rates were ramped up to reduce interior heat buildup and ammonia concentrations (FIG. 2D).

Litter analyses showed that the Inv-1 treatment significantly retained more nitrate nitrogen in the litter (FIGS. 3A through D) than the Comp-1 treatment. Organic nitrogen and total nitrogen were retained significantly (one Standard Error) larger in the Inv-1 houses until the last two weeks of the study where the absolute amounts were numerically but not significantly larger. Ammonium nitrogen was not significantly different between the treatments throughout the study period. These results suggest that housing and management characteristics removed ammonia from the litter about the same for both treatments but the Inv-1 treatment retained nitrogen in the litter in all other forms by reducing mineralization of organic nitrogen, uric acid, and other forms of nitrogen. It also suggests accelerated nitrification of ammonium to nitrate as a form of nitrogen retention by the Inv-1 treatment.

Figure 3A:
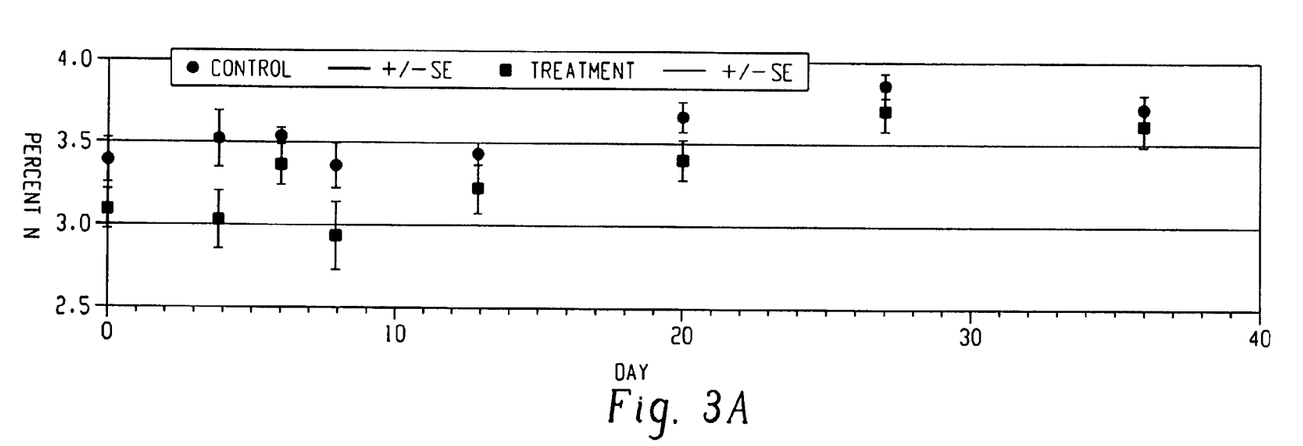
Figure 3B:
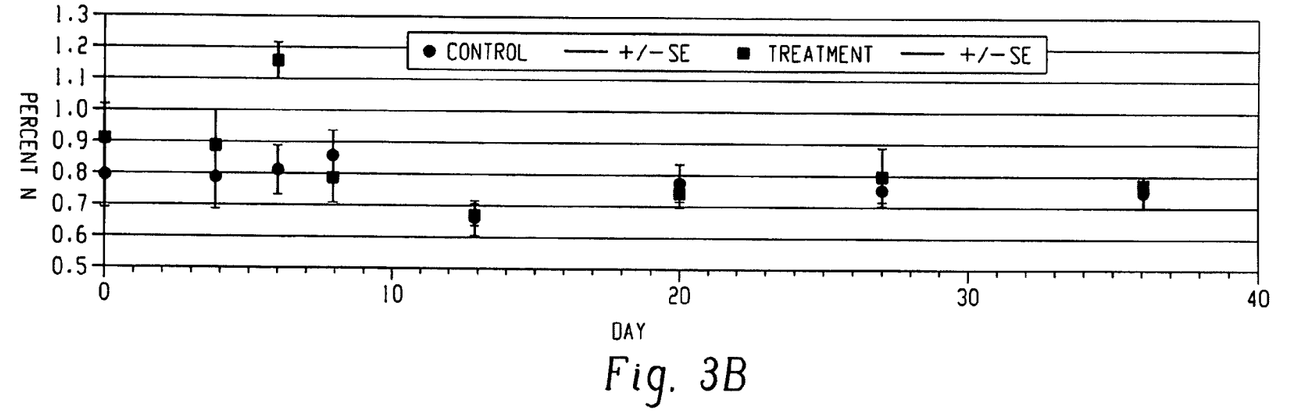
Figure 3C:
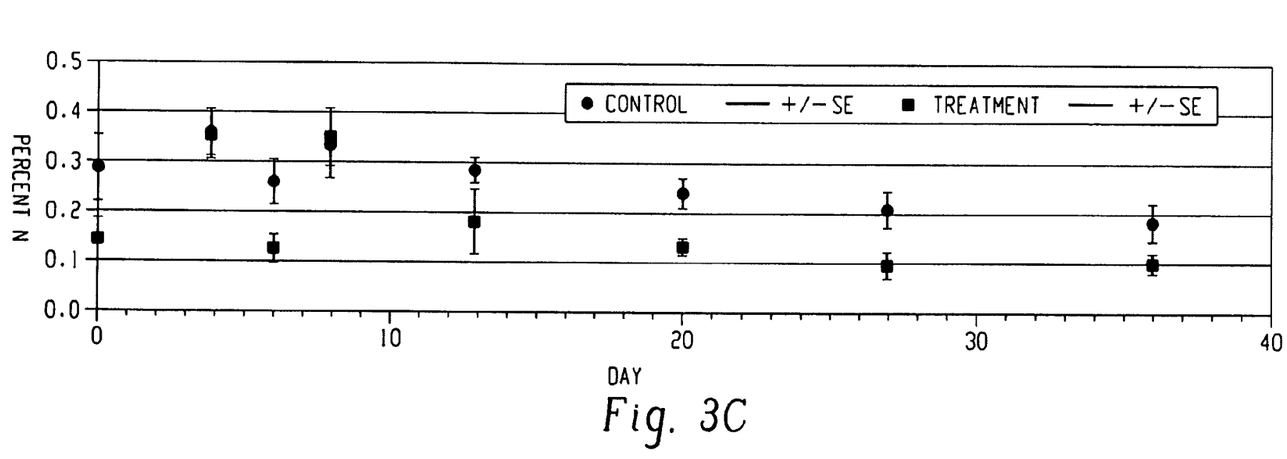
Figure 3D:
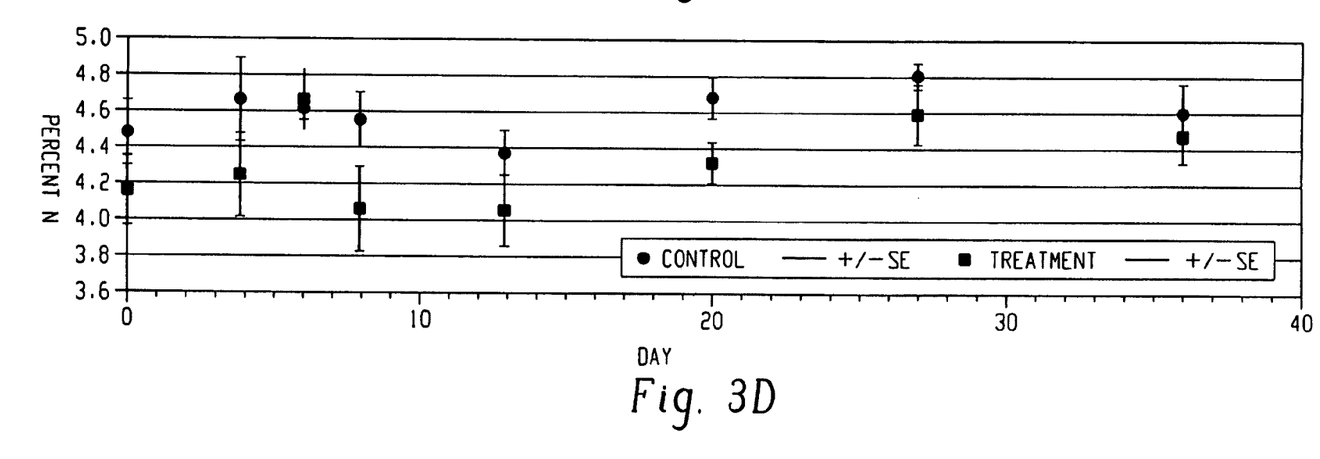
Figure 3E:
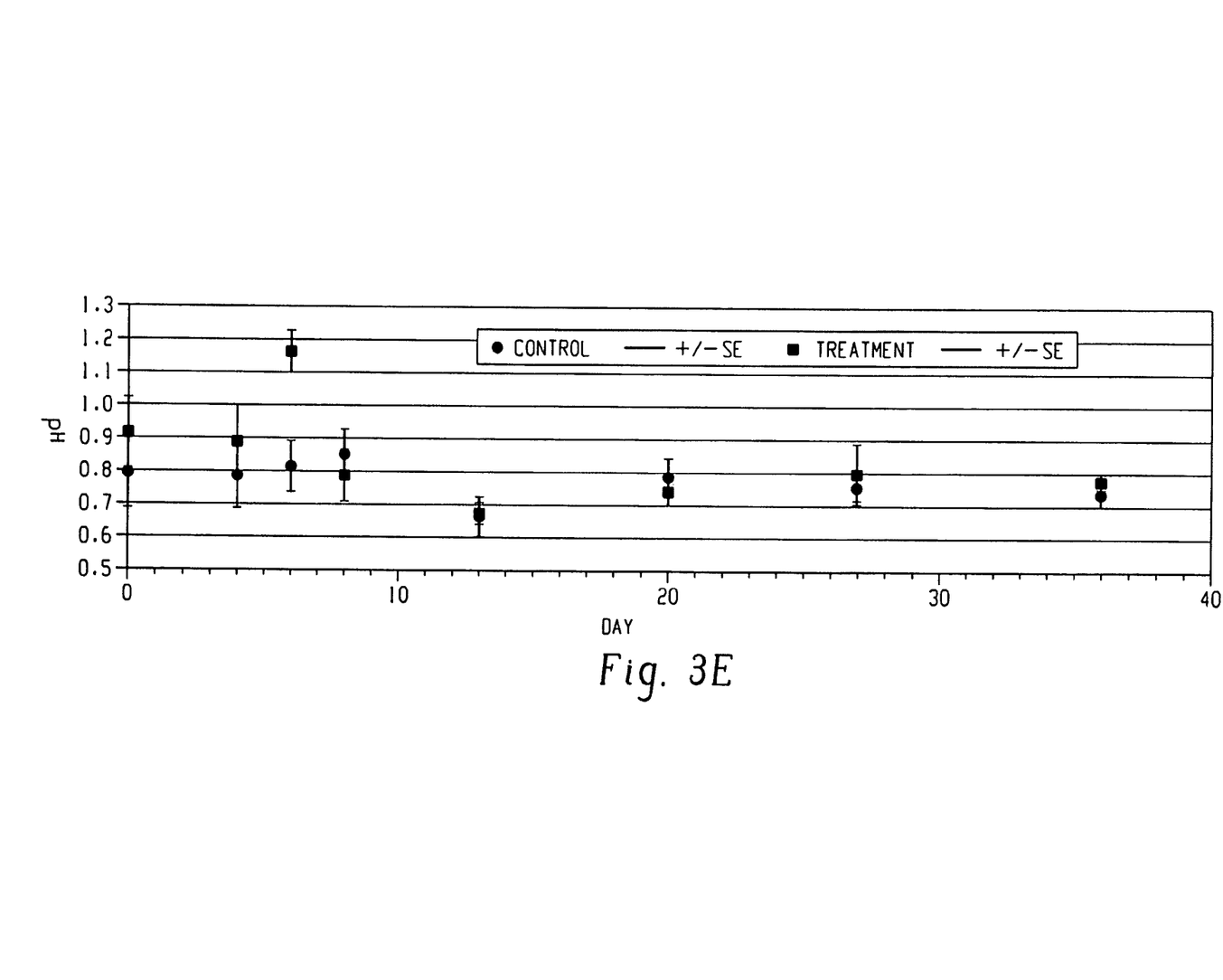
Figure 4A:
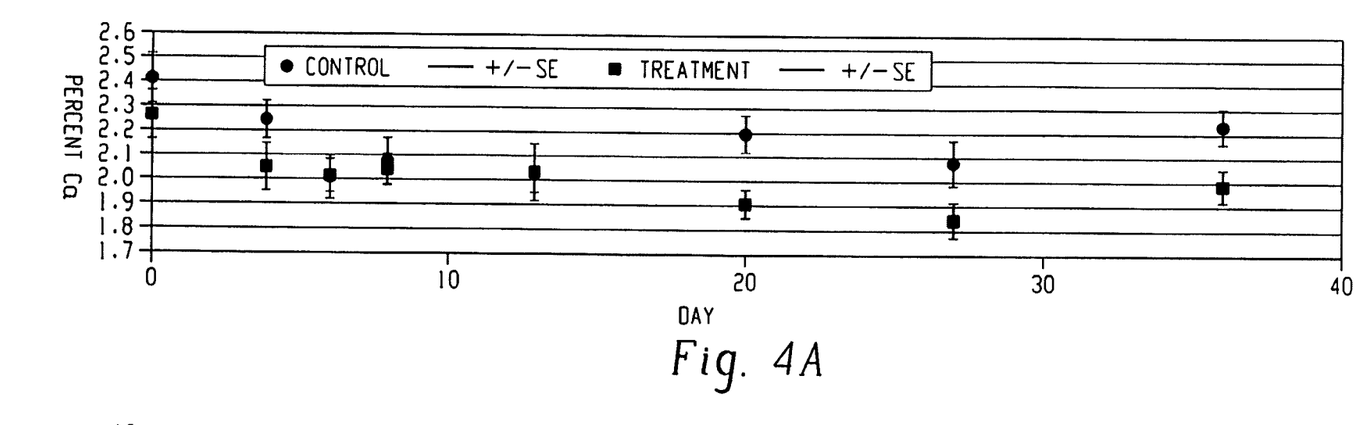
Figure 4B:
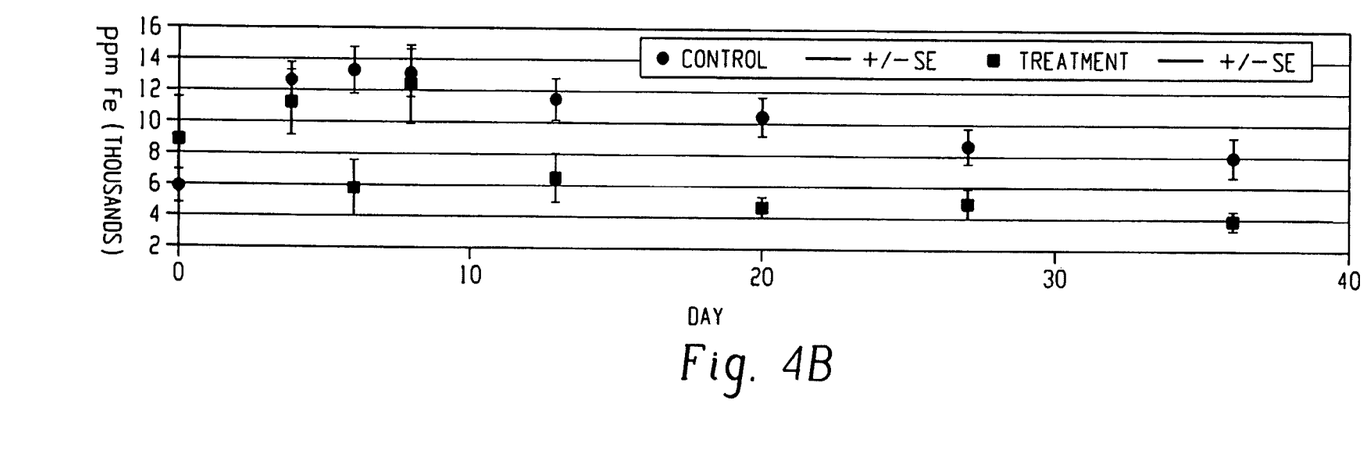
Figure 4C:
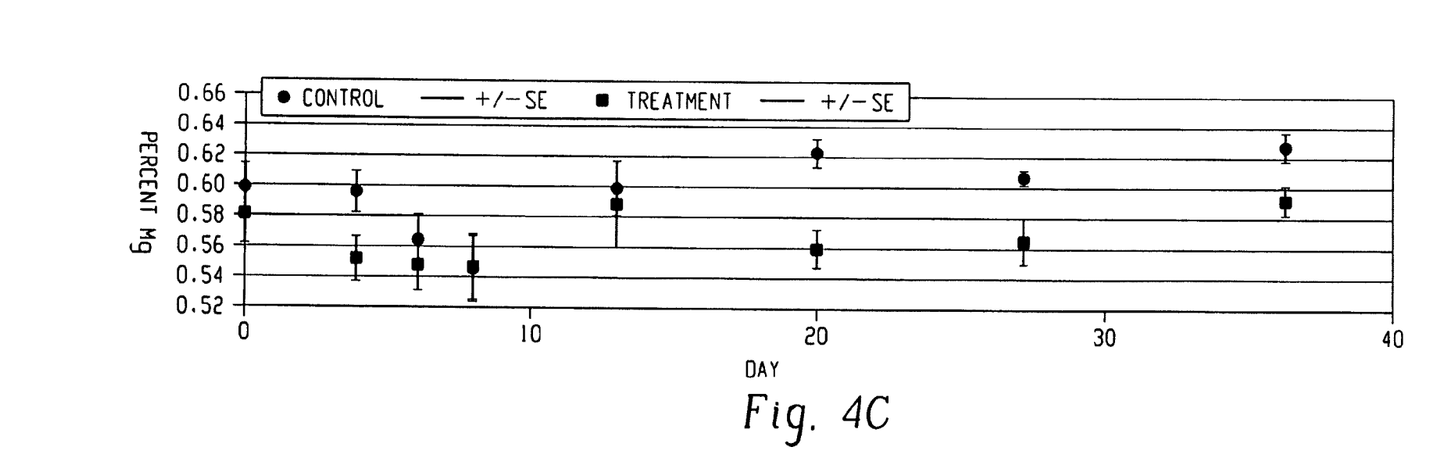
Figure 4D:
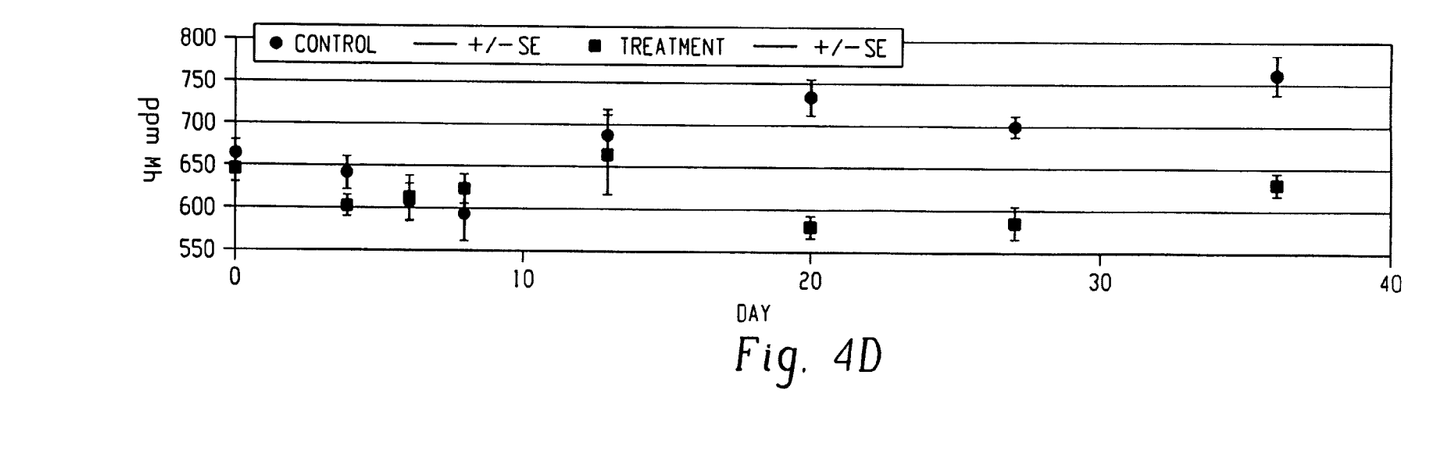
Figure 4E:
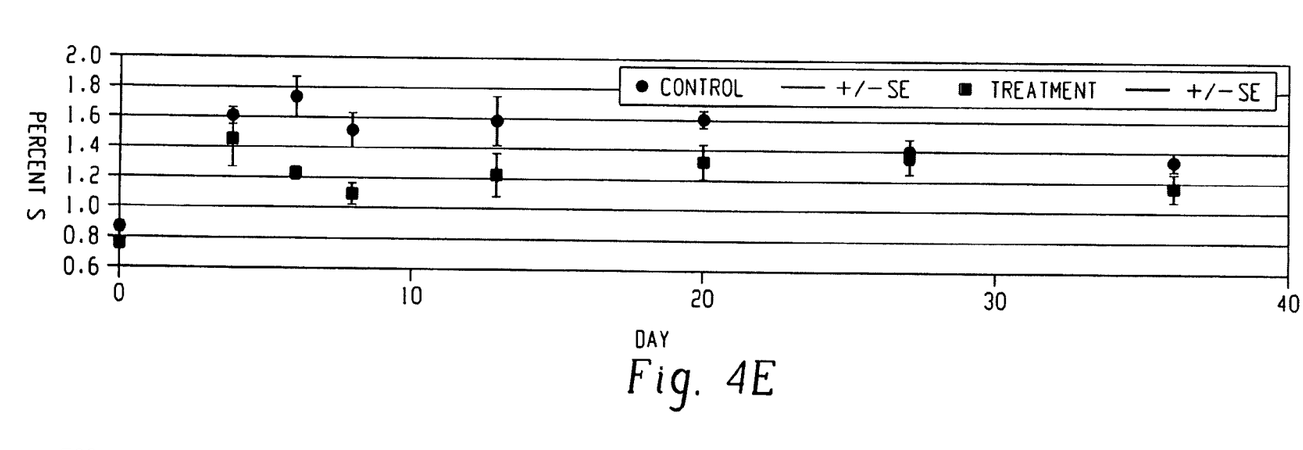
Figure 4F:
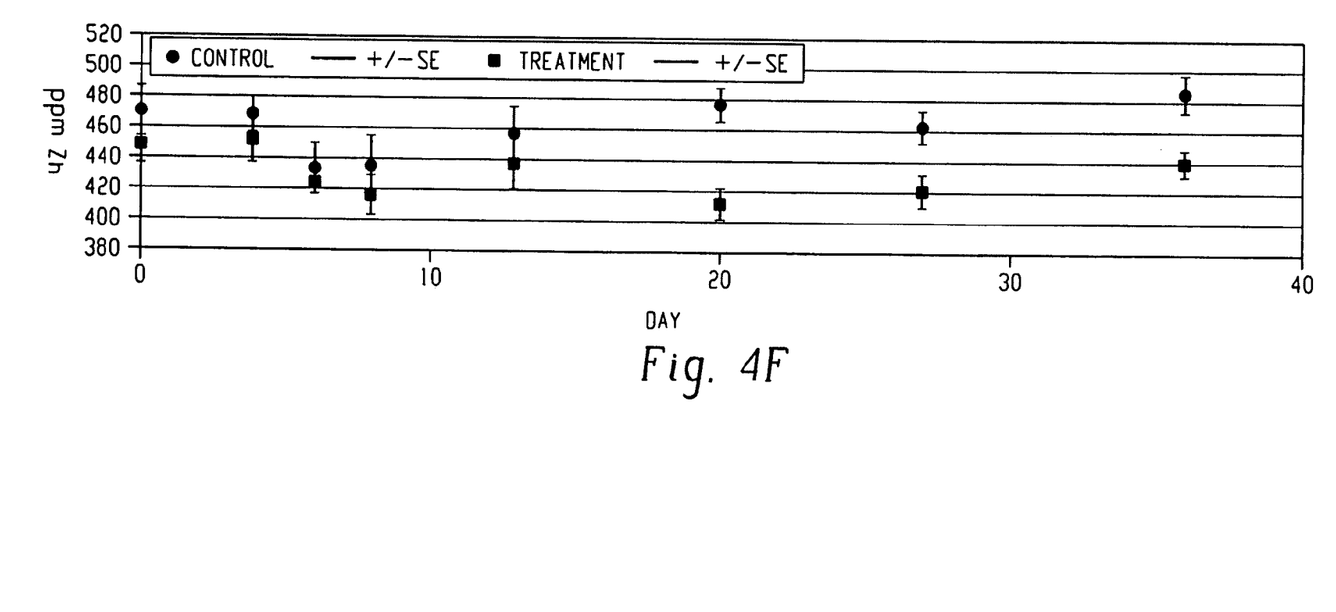
Figure 5A:
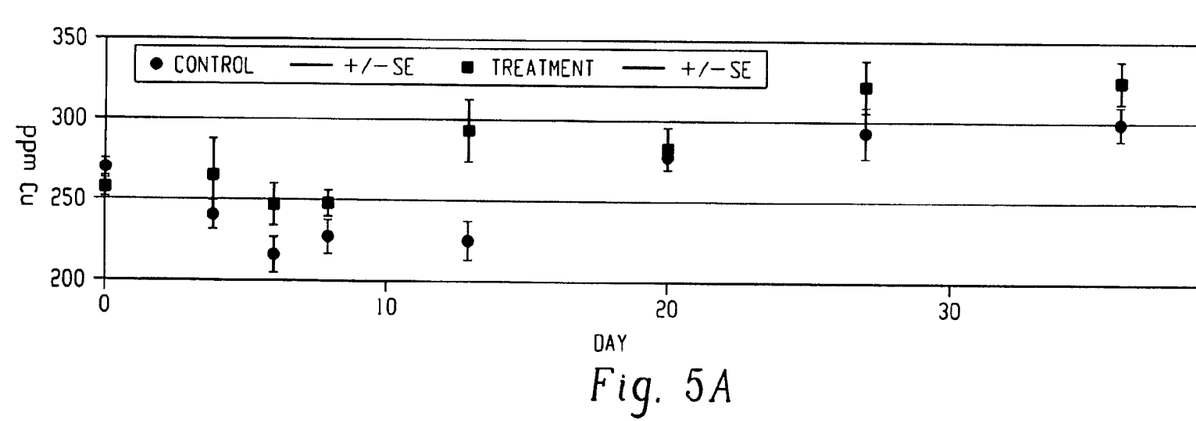
Figure 5B:
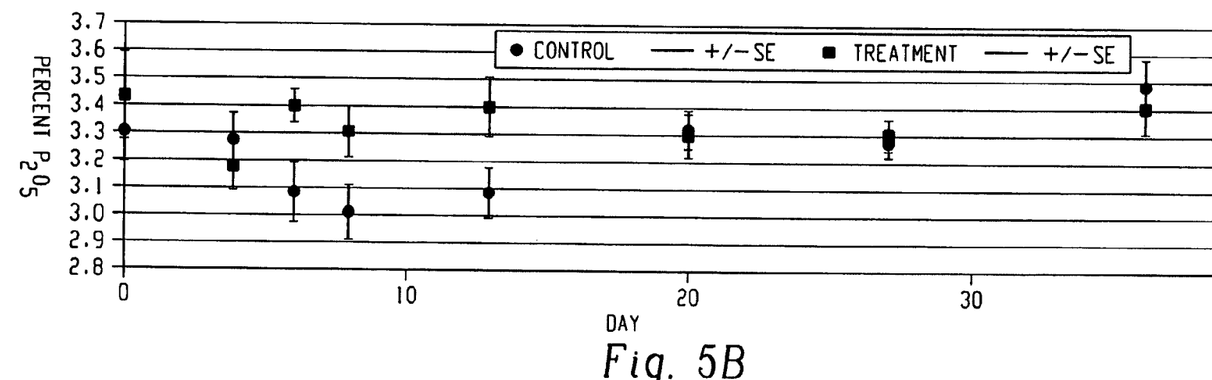
Figure 5C:
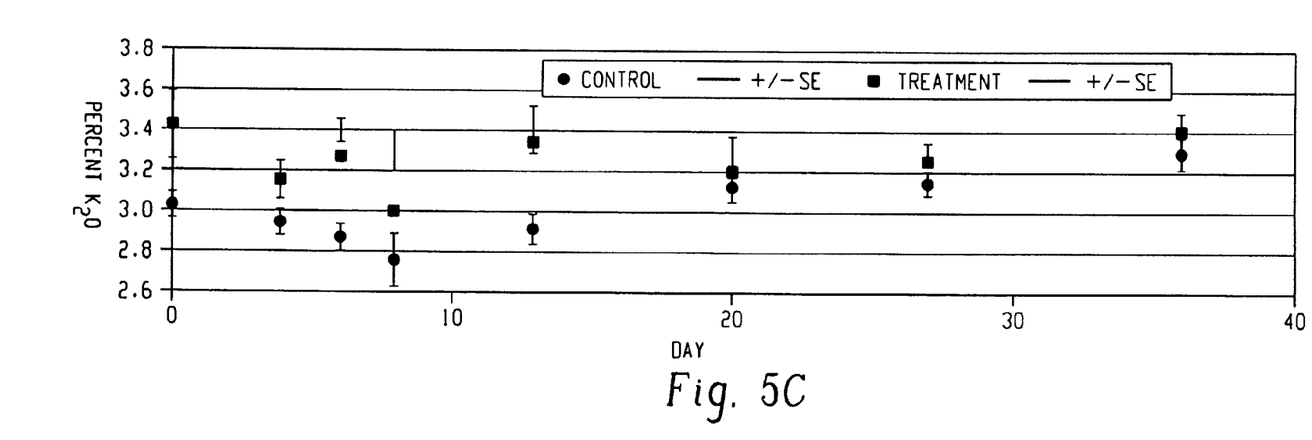
Figure 5D:
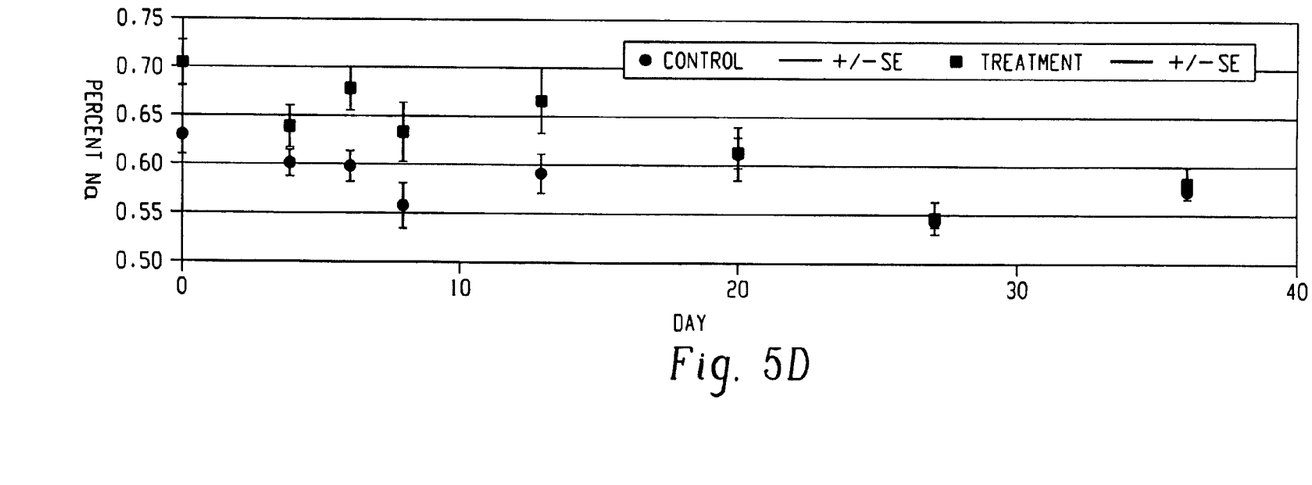
Figure 5E:
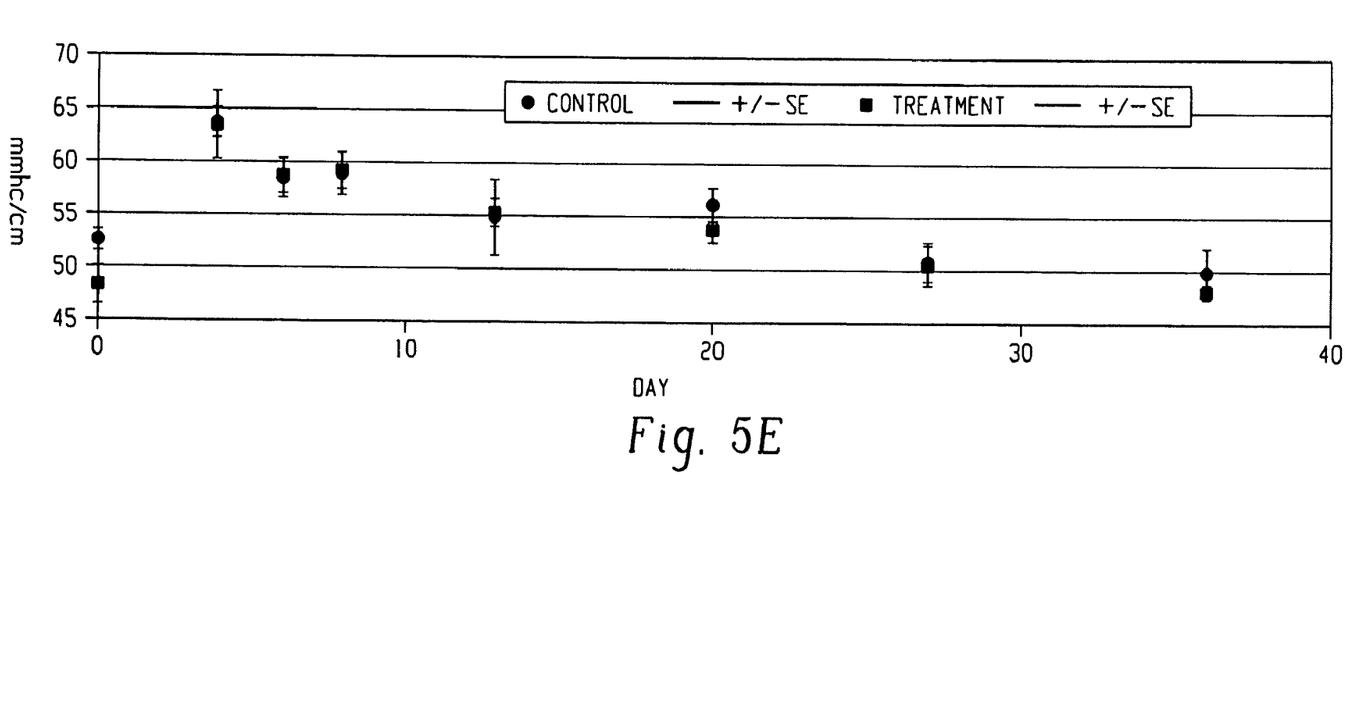

Ammonia is also controlled by increasing the hydrogen ion concentration (lower pH) in the litter. There was no significant difference in litter pH between the two treatments at the 100 lb laydown level (FIG. 3E).

Iron was higher in the Inv-1 houses, as anticipated, because of the treatment application, as well as calcium, magnesium, manganese, sulfur, and zinc (FIGS. 4A-F). There was no difference in copper, phosphorous, potassium, sodium, or soluble salts between treatments (FIGS. 5A-E).

There was no significant difference in mortality between treatments. Bird performance was not affected by the litter treatments though bird weights were slightly higher in the Comp-1 houses than in the Inv-1 houses (6.39 vs. 6.29, respectively). The results of this study suggest there are no differences in animal performance between the two litter treatments. This lack of difference is to be expected as each house was managed with a sufficient rate of air exchange to create an environment for optimal bird performance.

The Inv-1 treatment was, on average, superior to the Comp-1 treatment in reducing ammonia concentrations in the houses during the first 15 days after chick placement, despite wet litter conditions in two of the four houses. During the critical brooding period, the two treatments functioned equally well with regard to bird survivability and performance. The Inv-1 treatment did show significant retention of nitrogen in the litter over the Comp-1 treatment. This example shows the application of ferric sulfate in the granular, rapidly dissolving form of this example has advantages as a poultry litter treatment for ammonia control in commercial poultry production facilities.

Advantageously, the use of the ferric sulfate composition as described above is less risk to workers, it is more active per unit weight than typical litter and/or bedding material treatments, it becomes active more quickly in lowering pH of litter, and it provides a redox environment more inhibitory to ammonia producing microorganisms. Moreover, the ferric sulfate can be used for reduction of hydrogen sulfide emissions. Suitable applications include, but are not limited to, other animal manures, landfills, and the like.

In another embodiment, ferric ion also binds phosphorous more effectively than typical aluminum based litter treatments, potentially lowering phosphorous run-off on land-applied litter.

Although the example has been made to poultry, those of skill in the art will appreciate in view of this disclosure that the ferric sulfate composition of the present disclosure a composition can be used in other types of applications where it may be desirable to de-volatilize ammonia, reduce soluble phosphorous levels, and the like. Advantageously, in addition to lowering ammonia and sequestering phosphates, the use of the litter amendment serves to lower energy requirement as it relates to ventilation requirements due to the reduce ammonia emissions and thus, will add measurable value to the operation.

For example, the ferric sulfate composition can be applied for treatment of various animal based manures, landfills, and the like. This includes, but is not limited to, equine, dairy cattle and/or calves, and swine applications.

The singular forms "a," "an," and "the" include plural referents unless the context clearly dictates otherwise. All references are incorporated herein by reference.

While the disclosure has been described, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of treating poultry litter and/or bedding material for control of volatile ammonia and soluble phosphorous comprising:
    prior to introduction of poultry
    applying a granular form of a partially hydrated ferric sulfate composition to the poultry litter and/or bedding material at a coverage rate effective to reduce ammonia emissions and reduce soluble phosphorous levels, wherein the ferric sulfate is prepared by a process comprising oxidizing ferrous sulfate with sulfuric acid using a molecular oxygen oxidizing agent at an elevated pressure relative to atmospheric and at a temperature of 60° C. to 140° C. to produce a slurry, and drying the slurry to produce a gray to tan colored granular product.

2. The method of claim 1, wherein the partially hydrated ferric sulfate has a formula of $Fe_2(SO_4)_3 \cdot nH_2O$, wherein n is an integer from 1 to 10.

3. The method of claim 1, wherein the partially hydrated ferric sulfate has a formula of $Fe_2(SO_4)_3 \cdot nH_2O$, wherein n is an integer from 5 to 9.

4. The method of claim 1, wherein the partially hydrated ferric sulfate has a formula of $Fe_2(SO_4)_3 \cdot 7H_2O$.

5. The method of claim 1, further comprising maintaining the animal litter and/or bedding material at a pH less than 7.5.

6. The method of claim 1, wherein at least 90 percent of the partially hydrated ferric sulfate has a particle size greater than 0.2 millimeters and at least 50 percent of the ferric sulfate has particle size greater than 1 millimeter.

* * * * *